United States Patent
Guichard et al.

(10) Patent No.: US 7,583,593 B2
(45) Date of Patent: Sep. 1, 2009

(54) SYSTEM AND METHODS FOR DETECTING NETWORK FAILURE

(75) Inventors: James N. Guichard, Groton, MA (US); Jean-Philippe Vasseur, Dunstable, MA (US); Thomas D. Nadeau, Hampton, NH (US); Clarence A. M. Filsfils, Brussels (BE); David D. Ward, Somerset, WI (US); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 802 days.

(21) Appl. No.: 11/001,149

(22) Filed: Dec. 1, 2004

(65) Prior Publication Data

US 2006/0126495 A1    Jun. 15, 2006

(51) Int. Cl.
*G01R 31/08* (2006.01)
*H04L 12/26* (2006.01)

(52) U.S. Cl. .......................... 370/225; 370/242
(58) Field of Classification Search ......... 370/216–220, 370/254, 241, 242, 244; 714/1
See application file for complete search history.

(56) References Cited

U.S. PATENT DOCUMENTS

| | | | |
|---|---|---|---|
| 6,215,765 B1 * | 4/2001 | McAllister et al. ......... | 370/217 |
| 6,813,240 B1 | 11/2004 | Shah ........................... | 370/228 |
| 2002/0093954 A1 * | 7/2002 | Weil et al. .................... | 370/389 |
| 2002/0118636 A1 | 8/2002 | Phelps et al. ................. | 222/370 |
| 2003/0048754 A1 | 3/2003 | Bruckman ................... | 370/252 |
| 2004/0179471 A1 | 9/2004 | Mekkittikul et al. ........ | 370/218 |
| 2004/0218542 A1 * | 11/2004 | Lee ............................. | 370/248 |

OTHER PUBLICATIONS

PCT International Search Report (PCT Article 18 and Rules 43 and 44), Total pp. 3.

* cited by examiner

*Primary Examiner*—Kevin C Harper
(74) *Attorney, Agent, or Firm*—Brinks Hofer Gilson & Lione (57) ABSTRACT

A path verification protocol (PVP) which enumerates a series of messages sent to a set of nodes, or routers, along a suspected path identifies forwarding plane problems for effecting changes at the control plane level. The messages include a command requesting interrogation of a further remote node for obtaining information about the path between the node receiving the PVP message and the further remote node. The node receiving the PVP message replies with a command response indicative of the outcome of attempts to reach the further remote node. The series of messages collectively covers a set of important routing points along a path from the originator to the recipient. The aggregate command responses to the series of PVP messages is analyzed to identify not only whether the entire path is operational, but also the location and nature of the problem.

29 Claims, 7 Drawing Sheets

SYSTEM AND METHODS FOR DETECTING NETWORK FAILURE

BACKGROUND

Computer networks typically provide a physical interconnection between different computers to allow convenient exchange of programs and data. A plurality of connectivity devices, such as switches and routers, interconnect each user computer connected to the network. The connectivity devices maintain routing information about the computers and perform routing decisions concerning message traffic passed between the computers via the connectivity devices. Each connectivity device, or router, corresponds to a network routing prefix (prefix) indicative of the other computers which it has direct or indirect access to. Therefore, data routed from one computer to another follows a path through the network defined by the routers between the two computers. In this manner, the aggregation of routers in the network define a graph of interconnections between the various computers connected to the network.

In a graphical representation, therefore, such a network may be conceived as a graph of nodes between computers. The graph defines one or more paths between each of the computers connected to the network. The routers, therefore, define nodes in a network, and data travels between the nodes in a series of so-called "hops" over the network. Since each router is typically connected to multiple other routers, there may be multiple potential paths between given computers. Typically, the routing information is employed in a routing table in each router which is used to determine a path to a destination computer or network. The router makes a routing decision, using the routing table, to identify the next "hop," or next router, to send the data to in order for it to ultimately reach the destination computer. However, network problems may arise which render routers and transmission paths between routers inoperable. Such failures effectively eliminate nodes or hops in the graph, should such failure be detected by the control plane, defined by the network, therefore interfering with data traffic which would have been routed over the affected paths.

SUMMARY

In a typical computer network, failures may occur which prevent or delay transmission from one node to another. Such failures may be at the router itself, such as a bad port or forwarding engine, or may occur in the transmission line to the next hop, such as a physical interruption or line breach. A transmission line failure can typically be identified, and bypassed, by the Interior Gateway (Routing) Protocols (IGP). However, identification of a forwarding problem may not be possible by the IGP. Therefore, conventional methods approach such occurrences by manually "pinging" remote nodes to identify areas of potential problems. Such "pinging," or connectivity check, as is known in the art, involves sending a simple message to a remote node requesting an acknowledgment. If the acknowledgment (ack) is received, the remote node and intervening path is deemed operational. Such conventional methods, however, suffer from several deficiencies. Multiple paths may exist to the "pinged" node, and the intervening nodes may route the ping and corresponding ack around a failure. Further, a negative outcome is merely the non-receipt of the ack; no further information about where or why the failure occurred is provided, or if the failure will self correct itself such as in the case of a transmission line failure.

Configurations of the invention are based, in part, on the observation that conventional network diagnostic and troubleshooting mechanisms typically identify unreachable destinations, but not the location of the problem, such as a broken connection or malfunctioning router. Particular shortcoming of conventional routers is particularly evident in devices supporting Internet RFC 2547bis, concerning Virtual Private Networks (VPNs). Often, such so-called "forwarding/data plane" problems affecting data transport along the next hop are not apparent at the "control plane", or functions deciding the routing paths. Accordingly, control plane decisions may continue to route over a defunct path based on the forwarding plane's inaccurate view of the network, with the router either queuing or even discarding unforwardable packets. The latter is sometimes known as "black holing" of packets, resulting in reliance on application redundancy and retransmission mechanisms in order to avoid losing data, both which negatively affect throughput.

In other words, problems or failures at the forwarding plane level may not be apparent until an accrued backup or pattern of lost packets is recognized. Until such recognition, and subsequent manual intervention by the operator, control plane decisions continue to route along an inoperable path. It would be beneficial, therefore, to develop a path verification mechanism which can probe a particular routing path, and identify not only an end-to-end failure, such as the common "ping" messages, but also identify failure at an incremental point, or node, by transmitting a command and receiving a response indicative of other nodes which are visible to the incremental node. In this manner, a series of path verification messages can identify an incremental point, such as a node or path, at which such forwarding plane problems occur, and potentially override the data plane routing decisions to pursue an alternate routing path around the identified problem.

Accordingly, configuration of the invention substantially overcomes the shortcomings of conventional network failure detection and troubleshooting by providing a path verification protocol (PVP) which enumerates a series of path verification messages sent to a set of nodes, or routers, along a suspected path. The messages include a command requesting interrogation of a further remote node for obtaining information about the path between the node receiving the PVP message and the further remote node. The node receiving the PVP message (first node) replies with a command response indicative of the outcome of attempts to reach the further remote node (second node). In particular conventional devices, such as those according to RFC 2547bis, certain customer equipment (CE) edge routers do not have the visibility within the core (i.e. intervening public network), and therefore rely on another node, such as the provider equipment (PE) nodes to perform such verification. The series of messages collectively covers a set of important, predetermined, routing points along a path from an originator to a recipient. A path verification processor analyzes aggregate command responses to the series of PVP messages to attempt to identify not only whether the entire path is operational, but also the location and nature of the problem (port, card, transmission line, etc.). In this manner, the path verification mechanism discussed further below defines the path verification protocol (PVP) for enumerating a set of messages from the path verification processor in a network device, such as a router, and analyzing command responses from the set of nodes responding to the path verification messages for locating the failure.

In a typical network, as indicated above, data takes the form of messages, which travels from among network devices, such as routers, in a series of hops from a source to the destination. In an exemplary network suitable for use with the methods and devices discussed herein, a Virtual Private Network (VPN) interconnects two or more local networks, such as LANs, by a VPN service operable to provide security to message traffic between the subnetworks, such that nodes of each sub-LAN can communicate with nodes of other sub-LANs as members of the same VPN. In a typical VPN arrangement, the particular subnetworks may be individual sites of a large business enterprise, such as a bank, retail, or large corporation, having multiple distinct sites each with a substantial subnetwork. A conventional VPN in such an environment is well suited to provide the transparent protection to communication between the subnetworks.

In a typical VPN, each subnetwork has one or more gateway nodes, or customer equipment (CE) routers, through which traffic egressing and ingressing to and from other subnetworks passes. The gateway nodes connect to a network provider router, or provider equipment (PE), at the edge of a core network operable to provide transport to the other subnetworks in the VPN. The CE and PE routers are sometimes referred to as "edge" routers due to their proximity on the edge of a customer or provider network. The core network, which may be a public access network such as the Internet, a physically separate intranet, or other interconnection, provides transport to a remote PE router. The remote PE router couples to a remote CE router representing the ingress to a remote subnetwork, or LAN, which is part of the VPN. The remote CE router performs forwarding of the message traffic on to the destination within the remote VPN (LAN) subnetwork.

In such a VPN arrangement, a particular end-to-end path between a VPN source, or originator, and a VPN destination, or recipient represents a plurality of segments. Each segment is a set of one or more hops between certain nodes along the path. A plurality of segments represents a path, and include the local CE segment from the local CE router to the core network, the core segment between the PE routers of the core network, and the remote CE segment from the remote PE router to the remote CE router, as will be discussed further below. Other segments may be defined.

In particular, at one level of operation, configurations discussed herein perform a method for locating network failures by transmitting a plurality of path verification messages to a plurality of predetermined network points (i.e. nodes) according to a diagnostic protocol, and receive command responses from the nodes corresponding to the transmitted path verification messages, in which the responses include a test result according to the diagnostic protocol. The method tracks the command responses received in response to each of the plurality of path verification messages transmitted along a particular path from a source to a destination, and concludes, or computes, based on the receipt of responses from the predetermined network points, a routing decision including possible alternate routing paths for message traffic in the network. The command responses therefore allow the router or switch initiating the path verification messages to determine, based on the test result received in the responses, whether to reroute traffic in the network, and if so, to locate, based on the receipt and non-receipt of responses from particular network points, an alternate path.

In further detail, configurations of the invention perform identification of network failure by periodically transmitting diagnostic messages to a plurality of predetermined routing points along a path to a destination, and transmitting, if the diagnostic message indicates a problem with intermediate nodes along the path, a series of path verification messages, in which each of the path verification messages includes a command operable to direct an intermediate node (first node) to transmit a further message to a successive intermediate node (second node) in the path, receive the result from the further message, and report the result as a command response, such that the result indicates reachability of the successive (second) intermediate node from the first node. The method repeats the transmission of path verification messages to successive nodes along the path to the node indicating or reporting the problem in a systematic manner according to predetermined hops (i.e. "important" routing points). The method analyzes the received command responses from the successive path verification messages to identify the problem or failure, and accordingly, determines an alternate route based on the analyzing to bypass the intermediate node identified as a source of the indicated problem.

The transmission of the path verification messages further include 1) transmitting a set of path verification messages to each of a plurality of predetermined network points according to a diagnostic protocol, 2) receiving command responses corresponding to the transmitted path verification messages, in which the command responses including a test result according to the diagnostic protocol, and 3) tracking the command responses received from each of the plurality of path verification messages transmitted along a path from a source to a destination, in which tracking further comprising identifying the segment from which the response emanates.

Analyzing the received command responses includes analyzing the path verification messages to identify the first intermediate node for which the command response indicates a problem, and the previous intermediate nodes for which the command response to the diagnostic message indicates normal operation. The intermediate nodes, as indicated above, denote segments in the network, in which the segments further comprising a local segment between the customer device and a core network, a core network segment representing a plurality of provider devices, and a remote segment between the core network and the destination. Analyzing further includes identifying receipt and non-receipt, where the receipt includes an indication of accessible paths from the predetermined network point sending the message and non-receipt indicates an interceding failure according to the diagnostic logic. The analysis may identify a forwarding plane error indicative of inability of message propagation along a purported chosen path, such that determining an alternate path involves changing a control plane routing decision corresponding to the purported operational path.

In particular arrangements, the method identifies, based on the location and nature of the network failure, network points at which to alter traffic to reroute traffic around failures. Such points are intermediate network nodes, and identifying the intermediate nodes further corresponds to identifying a network prefix corresponding to a network hop between a test initiator and a destination.

Configurations disclosed herein address failures in the core network by transmitting a first path verification message, identifying non-receipt of a command response corresponding to the first path verification message from a core network intermediate router, and waiting a predetermined threshold, in which the predetermined threshold corresponds to a convergence time adapted to allow automatic routing table updates to compensate for erratic routes. The method then transmits a second path verification message, in which receipt of a command response to the second path verification message is indicative of a routing table change around the erratic route, employing the so-called convergence properties of the core network in rerouting around a failure using redundant paths.

Sending the diagnostic messages includes identifying important prefixes corresponding to network routing points having substantial logistic routing value, and transmitting the diagnostic messages for the important prefixes. Of the important prefixes, the method further optionally determines active prefixes, in which the active prefixes are indicative of a substantial volume of routing traffic during a previous threshold timing window. Such a substantial volume of routing traffic load is based on a predetermined minimum-quantity of bytes transported and the important paths corresponding to the number of alternative routing paths available, such as potential bottlenecks and periodic burst portals. Further, the method staggers the diagnostic messages based upon a jitterable configurable timer driving the set of messages covering the end to end path check, thus avoiding a PE router receiving a burst of diagnostic messages themselves.

In the exemplary arrangement, the path verification messages are probe messages according to the predetermined protocol. Probe messages include messages and packets sent for the purpose of confirming availability or switching with respect to a particular path, rather than transport of a data payload. The probe messages as employed herein include a test indicator, to specify a test result, and a destination indicator, to indicate the node concerned, and concluding further comprises applying diagnostic logic according to the predetermined protocol. The diagnostic logic of the protocol embodies rules or conditions indicative or deterministic of particular types of failures, such as failed forwarding engines, and catastrophic node failure.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations of the invention are based, in part, that conventional network diagnostic and troubleshooting mechanisms typically identify unreachable destinations, but not the location of the problem, such as a broken connection or malfunctioning router. Often, such so-called "forwarding plane" problems affecting data transport along to a successive next hop are not apparent at the "control plane" level, or functions deciding the routing paths (i.e. routing logic). Accordingly, control plane decisions may continue to route over a defunct path at the forwarding plane, with the router either queuing or even discarding unforwardable packets. The latter is sometimes known as "black holing" of packets, resulting in reliance on application redundancy and retransmission mechanisms in order to avoid losing data, both which negatively affect throughput.

In other words, problems or failures at the forwarding plane level may not be apparent until an accrued backup or patent of lost packets is recognized, and will never be apparent at the control plane level. Until such recognition, and manual intervention by the operator, control plane decisions continue to route along an inoperable path. Discussed further below is a path verification mechanism operable to probe a particular routing path, and identify not only an end-to-end failure, such as the common "ping" messages, but also identify failure at an incremental point, or node, by transmitting a command and receiving a response indicative of other nodes which are visible to the incremental node. In this manner, a series of path verification messages can identify the location at which such forwarding plane problems occur, and override the data plane routing decisions from the routing logic to pursue an alternate routing path around the identified problem.

The path verification mechanism described in further detail herein employs a path verification protocol operable to transmit path verification messages accordingly the protocol for attempting to diagnose and identify the location of network failures. Therefore, the path verification device, such as a data communications device (i.e. router) having a path verification processor as disclosed herein, is operable to perform the path verification using the path verification protocol.

The system as disclosed herein, therefore, includes a path verification processor executing, or performing, in a router having instructions for performing the method for locating a deficient network interconnection disclosed in detail herein, including identifying a path from a data communication device to a remote network destination, in which the path further includes a plurality of segments, in which each segment is delimited by a number of hops. The path verification processor identifies the failure point by identifying a segment order defined by a path to the destination, and iteratively transmitting a probe to each successive hop along the ordered path. The path verification processor concludes, if a probe response returns with respect to a particular hop, that the path is unobstructed up to the hop corresponding to the returned probe, and concludes, if the probe response is not received for a particular probe, that an obstruction exists between the hop corresponding to the particular probe and previous hop. The path verification processor then identifies, based on the hop and/or preceding hops corresponding to the concluded obstruction, an alternate path, and determines, based on the identified alternate path, whether to direct message traffic to the identified alternate path.

Accordingly, configuration of the invention substantially overcome the shortcomings of conventional network failure detection and troubleshooting, such as pinging, by providing a path verification protocol (PVP) which enumerates a series of messages sent to a set of nodes, or routers, along a suspected path. The messages include a command requesting interrogation of a further remote node for obtaining information about the path between the node receiving the PVP message and the further remote node. The node receiving the PVP message replies with a command response indicative of the outcome of attempts to reach the further remote node. The series of messages collectively covers a set of important routing points along a path from the originator to the recipient. The aggregate command responses to the series of PVP messages is analyzed to identify not only whether the entire path is operational, but also attempt to locate the failure (port, card, switching fabric etc.). In this manner, the path verification mechanism defines the path verification protocol (PVP) for enumerating a set of messages from a path verification processor in a network device, such as a router, and analyzing command responses from the set of nodes responding to the path verification messages for locating the failure.

Figure 1:
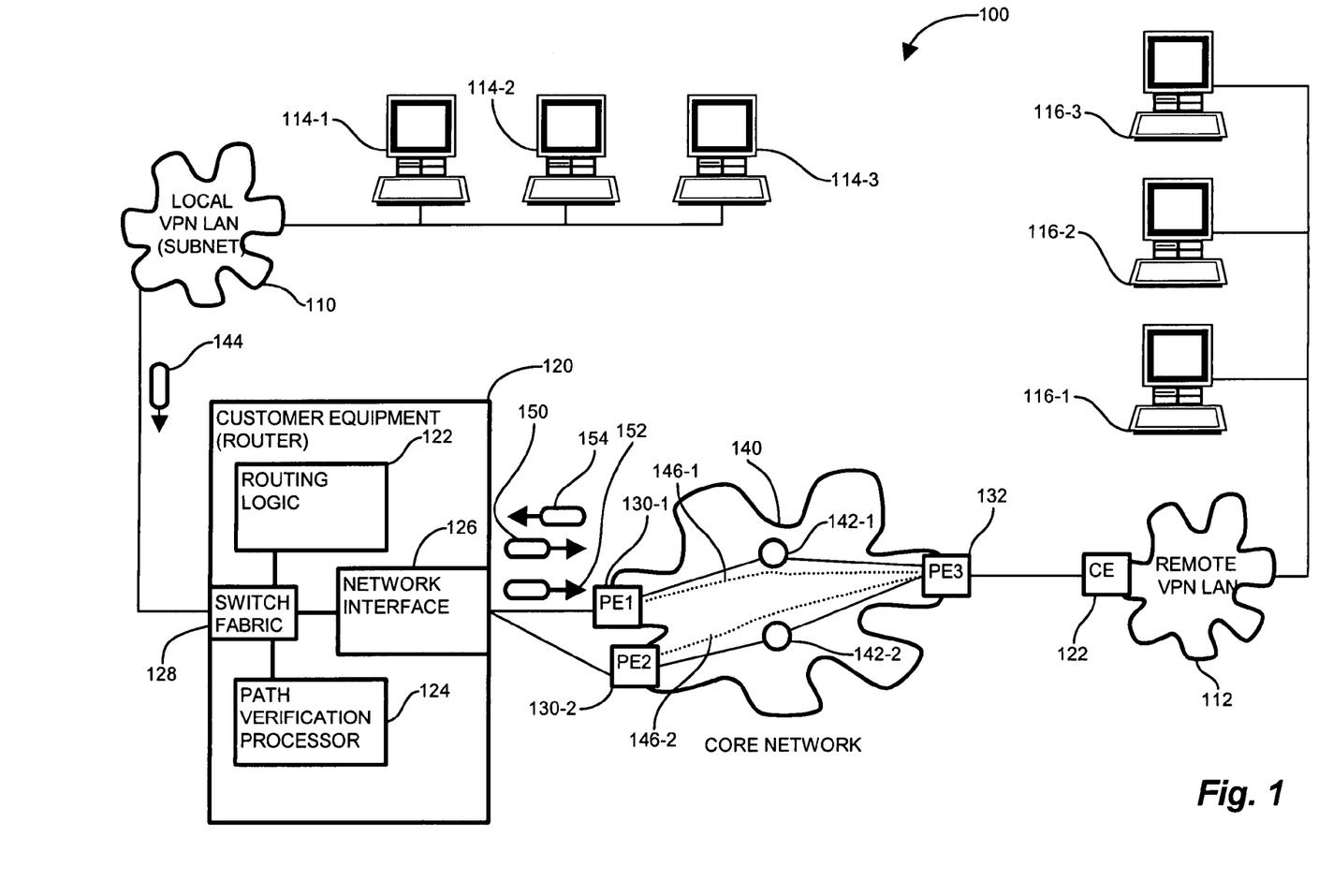
FIG. 1 is a context diagram of a network communications environment including network nodes defining paths via multiple provider equipment devices (routers) operable for use with the present invention.

FIG. 1 is a context diagram of a network communications environment including network nodes defining paths operable for use with the present invention. Referring to FIG. 1, the network communications environment 100 includes a local VPN LAN subnet 110 interconnecting a plurality of local users 114-1 . . . 114-3 (114 generally). The local LAN 110 connects to a gateway customer equipment CE router 120, which couples to one or more pieces of provider equipment devices 130-1 and 130-2 (130 generally). As will be discussed in further detail below, the CE router 120, being cognizant of the multiple PE routers 130-1 and 130-2, may perform routing decisions concerning whether to route traffic via routers 130-1 or 130-2, based upon considerations discussed herein, typically another router, at the edge of the core network 140. The CE router 120, or initial path verification device, includes routing logic 122 operable for typical control plane routing decisions, a path verification processor 124 operable to locate failures and supplement the routing decisions, and a network interface 126 for forwarding and receiving network traffic. The switching fabric 128 is responsive to the routing logic 122 for implementing the switching decisions via the physical ports on the device (not specifically shown). A core network 140 includes a plurality of core nodes 142-1 . . . 142-2 (142 generally), such as various routers, hubs, switches, and other connectivity devices, which interconnect other users served by the provider. A remote provider equipment device 132 (i.e. remote PE router) couples to a remote customer equipment router 122 serving a remote VPN subnet, such as VPN LAN 112. The remote VPN LAN 112, as its counterpart subnet 110, servers a plurality of remote users 116-1 . . . 116-3 (116 generally).

The principles embodied in configurations of the discussed herein may be summarized by FIG. 1, and discussed in further detail below with respect to FIG. 3 and the flowchart in FIGS. 4-7. The local CE router 120 routes a packet sent from a user 114 on the local LAN 110 to one of the provider equipment routers 130, denoting entry into the core network 140. The PE routers 130-1 and 130-2 may forward the packet toward its intended destination via a particular path 146-1 or 146-2, respectively, across core network 140. For ease of illustration assume that PE1 forwards the packet 144 to node 142-1, for example, by invoking PE1 130-1 as the entry into the core network 140.

If a problem develops at node 142-1, for example, the path verification processor 124 on CE router 120 invokes the PE router 130 to identify the problem via a set of periodic diagnostic messages 150, and the PE router 130 locates the problem via a set of path verification messages 152, both discussed further below. Accordingly, the path verification processor 124 on CE router 120 directs the routing logic 122 to route the packet 144 via the PE2 router 130-2.

As indicated above, the distinction between control plane and forwarding plane operation is effectively bridged by the path verification processor 124. Conventional routing logic identifies a preferred route for a particular packet. A problem at the level of the forwarding plane may not be apparent at the control plane where the routing logic computes the preferred route. Accordingly, conventional routing logic at PE router 130-1 continues to employ, in the above example, route 146-1, being unaware of the problem of node 142-1. The path verification processor 124 on CE router 120, employing the path verification protocol discussed herein, identifies the alternate route to the core network 140 via PE router 130-2, which employs node 142-2 rather than defunct node 142-1, over the path 146-2, and overrides the preferred route decision otherwise employed by the routing logic. Note that the software, hardware and/or firmware which enables the operations performed by the path verification processor 124 may be distributed throughout the PE and CE devices 130 and 132, and are shown in enlarged CE device 120 for simplicity. Each of the PE and CE devices (routers) may be enabled with a path verification processor or other mechanism responsive to the path verification processor 124 and methods thereby enabled. Since the alternate route via 130-2 extends path 142-2 through 146-2 from PE2 across the core network 140. Therefore, CE1 can perform routing decisions to switch its traffic from PE1 to PE2, which effectively bypass node 142-1 in the core in favor of node 142-2, in the exemplary network shown. It should be noted that such routing decisions apply path information from the network, such as wherein paths 146-1 and 146-2 are disjoint, with only 146-1 relying on node 142-1.

Figure 2:
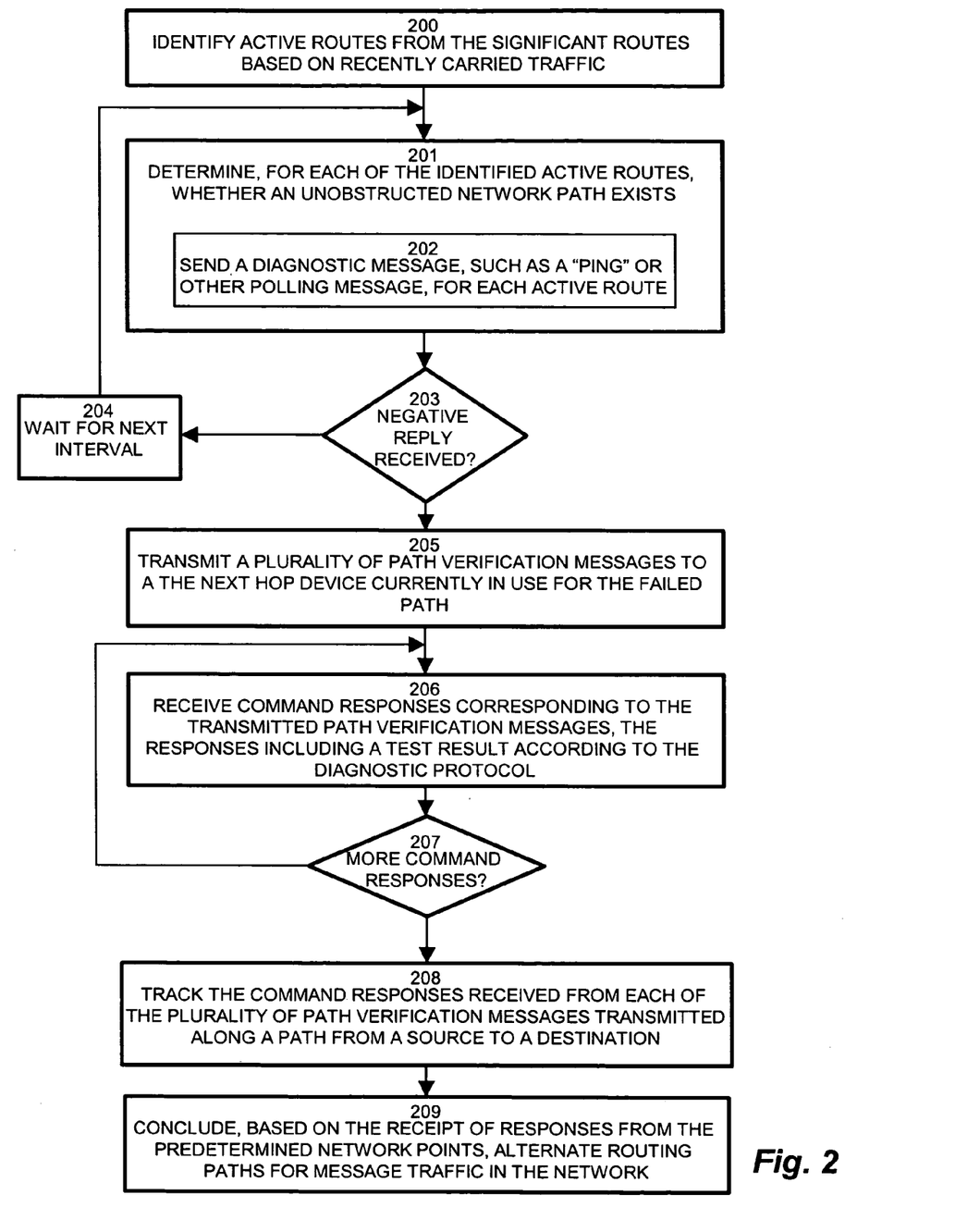
FIG. 2 is a flowchart of employing a path verification mechanism in the network of FIG. 1.

FIG. 2 is a flowchart of an exemplary customer equipment device (e.g. router 120) employing a path verification mechanism in the network of FIG. 1. Referring to FIGS. 1 and 2, the router 120 identifies active routes from the significant routes based on recently carried traffic, as depicted at step 200. The active routes are paths or switching options which currently carry substantial traffic, as determinable from observing the activity of the switching fabric, sniffing, or other scanning mechanism. The path verification processor 124 determines, for each of the identified active routes, whether an unobstructed network path exists, as depicted at step 201. The path verification processor 124 may perform a so-called "ping" or other mechanism for determining the availability of each of the active routes. It should be noted that the active routes are denoted by particular devices, or routers, responsible for message throughput along the active paths, and are deterministic in determining whether problems exist. These routers are typically designated by a prefix indicative of the IP addresses they serve, as is known to those of skill in the art.

The path verification processor 124, therefore, first sends a diagnostic message 150, such as a "ping" or other polling message, for each active route to determine if a potential obstruction exists, as depicted at step 202. The path verification processor 124 performs a check, as shown at step 203, to determine if a negative reply is received, indicating a non responsive node. If no negative replies are received from the active routes, i.e. the routers corresponding to the active routes, control passes to step 204 in anticipation of the next diagnostic interval.

Following sending the periodic diagnostic messages to each of the active routes, as disclosed in steps 202-204, for each prefix, i.e. active route, for which the path verification processor 124 did not receive a response, the path verification processor 124 transmits a plurality of path verification messages 152 to the next hop device currently in use for the failed path/s, as shown at step 205. The path verification messages 152 are sent in a predetermined order, or pattern, to prefixes (routers) in the path for which problems were discovered. Responsive to the path verification messages 152, the path verification processor 124 receives command responses 154 corresponding to the transmitted path verification messages, in which the command responses 154 include a test result according to the diagnostic protocol, as depicted at step 206. A check is performed, at step 207, to determine if there are more command responses 154 for retrieval, and control reverts to step 206 accordingly. Note that absence of receipt of a command response 154 is also deemed a negative response, as discussed in further detail below. The path verification processor 124 tracks the set of command responses 154 received from each of the plurality of path verification messages 152 transmitted to the local PE router, as depicted at step 208, and concludes, based on the receipt of responses 154 from the local PE router, alternate routing paths for message traffic 144 in the network 100, as shown at step 209. Therefore, the set of path verification messages 152 sent from CE router 120 elicits a set of command responses 154, each indicative of path verification information. Typical path verification information is, for example, an indication of whether a router can communicate with a particular segment of the end-to-end network. The set of all command responses 154 indicates which segments are functioning correctly, and consequently, localizing the occurrence of failure, now discussed in further detail.

Figure 3:
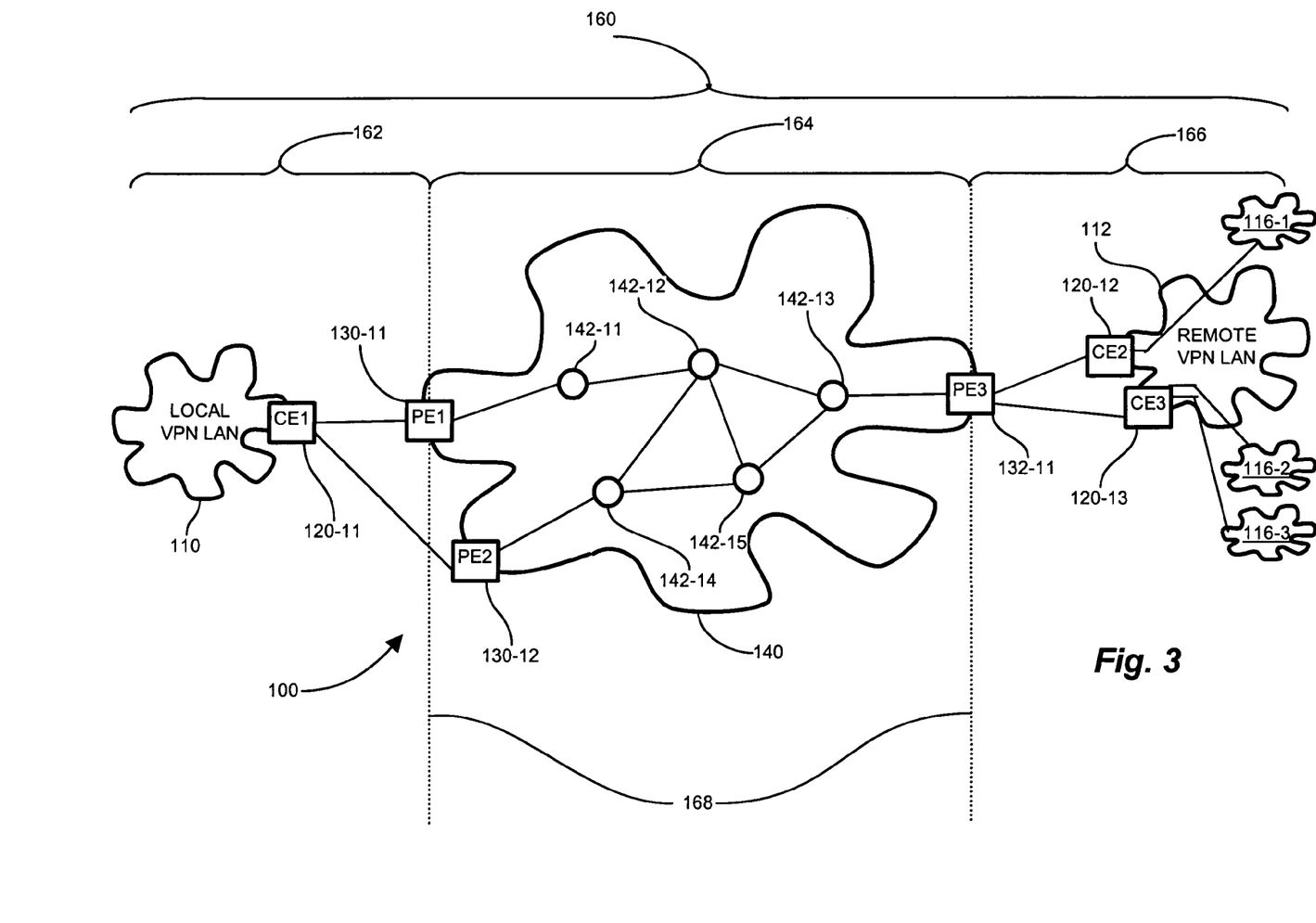
FIG. 3 is a block diagram of the path verification device in exemplary network of FIG. 1.

FIG. 3 is a block diagram of the path verification processor 124 in the CE router 120 of the exemplary network of FIG. 1. Referring to FIG. 3, the network 100 includes customer equipment 120-11 . . . 120-13 (120 generally), provider equipment 130-11, 130-12 and 132-11, and intermediate nodes 142-11 . . . 142-15 (142 generally). The paths through the network 100 can be subdivided into segments 160, demarcated by the customer equipment 120 and provider equipment 130, 132 and shown by dotted lines 168. A local VPN segment 162 includes the path from the local VPN 110 to the provider equipment 130-11 and 130-12.

A core segment 164 includes the core network 140 to a remote provider equipment 132-11 device, and a remote VPN segment 166 covers the path from the remote PE router 132-11 to the remote VPN 112. A further plurality of hosts S1, S2 and S3 are within the remote VPN LAN subnet 112, such as local LAN server nodes, discussed further below.

In particular configurations, the path verification processor 124 employs the path verification protocol (PVP) by the PE node 130 to inform the CE node 120 of path availability to identify the segment 160 in which the failure occurs. Since routing control over the core network segment 164 may be limited, routing decisions by the CE router 120 may be limited in effectiveness. However, in the local segment 162, there may be multiple PE routers 130-11, 130-12 for access into the core network 164. Further, these PE routers 130-11, 130-12 may connect to different nodes 142 in the core network 140, such as 142-11 and 142-14, respectively. Accordingly, a routing decision to employ a different provider equipment router 130 may effectively bypass a failure in the core network 140. Similarly, multiple CE routers 120 may serve a particular subnet VPN. In the example shown, the remote VPN LAN 112 couples to CE routers 120-12 and 120-13 (CE2 and CE3). Accordingly, if the path verification processor 124 on 132-11 (PE3) identifies a problem with either CE2 or CE3, it may employ the other CE router for access to the remote subnet 112 from the provider equipment 132.

By way of a further example, continuing to refer to FIG. 3, a preferred route from VPN subnet 110 to VPN subnet 112 includes nodes PE1, 142-11, 142-12, 142-13, leaving the provider network at PE3 and entering the remote VPN subnet 112 at CE2. Assume further that a forwarding plane routing error develops at node 142-11. Accordingly, the path verification processor 124 on 120-11 (CE1) identifies via periodic diagnostic message (discussed further below) that a problem exists, and invokes the path verification protocol as follows. At the request of CE1 the path verification processor 124 on PE1 sends a path verification (PVP) message 152 to router PE3, effectively inquiring "can you see subnet 112"? PE3 may or may not receive the PVP message. If it does then PE3 sends a further PVP message to test the remote segment 166 to subnet 112, and confirms continuity. Accordingly, PE3 sends a command response 154 back to PE1 indicating proper operation of the segment 166 from PE3 to CE2. If a problem was detected, nonetheless, between PE3 and CE2, the path verification processor 124 on PE3 could employ CE3 as the reroute decision into the VPN subnet 112. If a positive response was received, indicating that segments 164 and 166 are intact (e.g. in this case there is nothing wrong with node 142-11), then the path verification processor 124 on CE1 can deduce that the problem lies at node 130-11.

If the path verification processor 124 on PE1 does not receive a response to its PVP message to PE3 within a set time it will assume a problem between itself and PE3 and therefore progresses through nodes 142 in the core network segment 164, eventually attempting to interrogate node 142-11. The path verification processor 124 on PE1 sends a PVP message 152 to node 142-11. As PE1 is operational, and it receives a positive response to its PVP message from node 142-11 it can deduce that the problem lies between node 142-11 and 142-12 and PE1 sends a command response 154 to CE1 120-11 indicating a core data plane failure as the source of the failure rather than a normal convergence event. Accordingly, the path verification processor 124 at router CE1 analyzes the returned command responses 154 and determines that the PE1 router 130-11 should not be used. Further, the path verification processor 124 identifies router PE2 130-12 as an alternate entry into the core network 140 which also provides a path to PE3. Accordingly, the path verification processor 124 on CE1 implements a routing decision to override the routing logic 122 to send traffic to the core network 140 via provider equipment router 130-12 (PE2).

FIGS. 4-7 are a flowchart of the operation of the path verification mechanism using the path verification device (i.e. router) 120 of FIG. 1 in the network of FIG. 3. Referring to FIGS. 1 and 3-7, the method of identifying network failure employing the path verification processor 124 disclosed herein includes periodically transmitting diagnostic messages 150 to a plurality of predetermined routing points, such as destination 116, as depicted at step 300. The path verification processor 124, to identify the intermediate nodes, identifies the network prefix corresponding to a network hop between a test initiator and a destination, as shown at step 301. This next hop will typically be a locally attached PE router. As indicated above, a typical TCP/IP (Transmission Control Protocol/Internet Protocol) routing configuration assigns individual devices, or routers, with a network prefix indicative of the IP addresses it may route to, or "see." Accordingly, the path verification processor 124 on CE1 is only able to see it's locally attached PE routers and must therefore rely on PVP processing results from these PEs. The PE routers are able to identify the active paths 146 via a set of prefixes which define the routers in the path 146 between it and the exit point toward destination 116 (which is 132-11 (PE3)).

Figure 4:
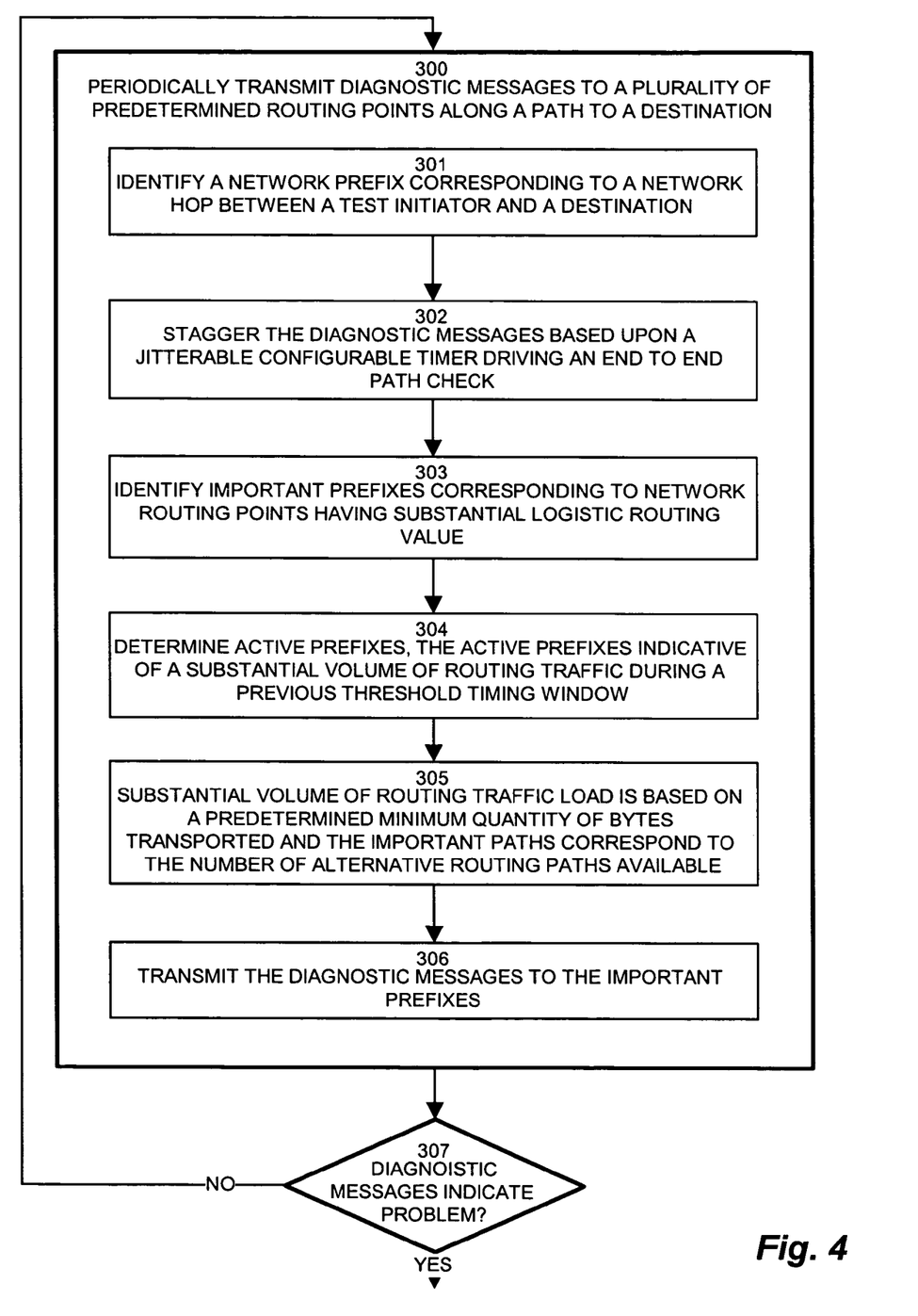
FIGS. 4-7 are a flowchart of the operation of the path verification mechanism using the path verification device of FIG. 3 in the network of FIG. 4.

The path verification processor 124 staggers sending the diagnostic messages 150 to each of the prefixes based upon a jitterable configurable timer driving an end to end path check, as depicted at step 302. The path verification processor 124, at regular intervals, sends or polls the active routes, as indicated above. Staggering the messages 150 avoids a sudden burst of diagnostic messages 150 at each interval. Such prefixes receiving the diagnostic messages 150 are denoted as important prefixes (which can be identified by means of access list), and correspond to network routing points having substantial logistic routing value, as depicted at step 303. Further, from the important prefixes, the path verification processor 124 determines active prefixes, in which the active prefixes indicative of a substantial volume of routing traffic during a previous threshold timing window, as disclosed at step 304. Additionally, certain prefixes may experience periods of dormancy, or may be utilized primarily at particular times, such as daily or weekly backups or downloads. Accordingly, determination of a substantial volume of routing traffic load is based on a predetermined minimum quantity of bytes transported and the important paths correspond to the number of alternative routing paths available, as shown at step 305. For example, financial institutions may tend to conduct many transactions at the end of the business week, on Friday afternoons. Accordingly, certain prefixes may be denoted as only active on Friday afternoon, because at such a time, routing problems would be particularly invasive to business operations. After determining the active prefixes, the path verification processor 124 transmits the diagnostic messages 150 to the important, active prefixes, as depicted at step 306.

Figure 5:
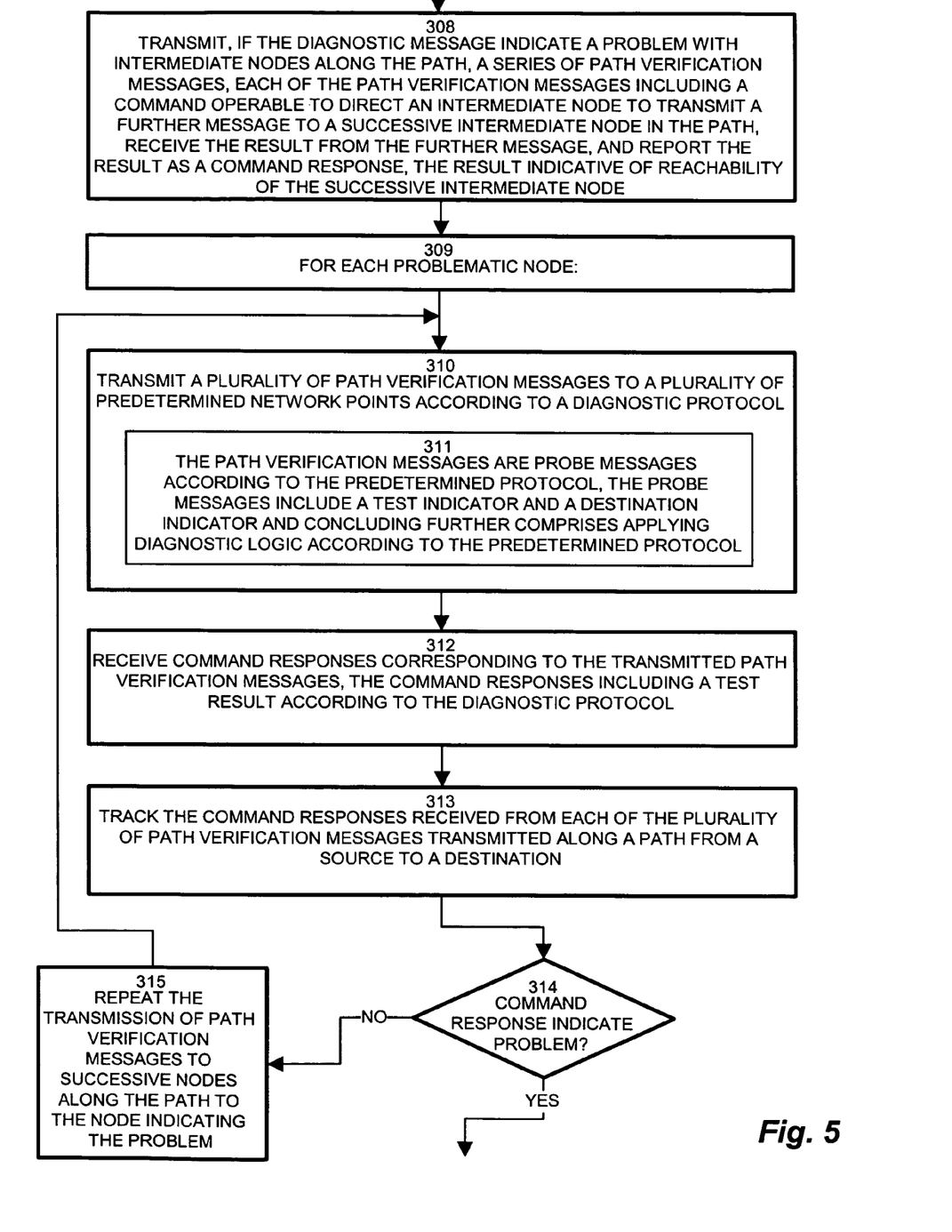

The path verification processor 124 performs a check, as shown at step 307, to determine if any of the diagnostic messages 150 indicate problems, typically due to non-receipt of an acknowledgment. If no diagnostic messages 150 indicate a problem, control reverts to step 300 for the next interval. However, if one or more destinations does not acknowledge the diagnostic message 150, the path verification processor 124 begins transmitting a series of path verification messages, in which each of the path verification messages includes a command operable to direct an intermediate PE node to a) transmit a further message to a successive intermediate node in the path, b) receive the result from the further message, and c) report the result as a command response, in which the result is indicative of reachability of the successive intermediate node, as depicted at step 308. Following the periodic diagnostic messages 150 to each of the active routes (i.e. messages to active prefixes), as disclosed in steps 300-306, the path verification processor 124 applies path verification to identify and locate problems for prefixes which did not reply. As depicted at step 309, for each problematic destination, the path verification processor 124 on PE1 transmits a plurality of path verification messages 152 to a plurality of predetermined network points (i.e. active prefixes) according to a diagnostic protocol, as shown at step 310. In the exemplary configuration herein, the path verification messages 152 are probe messages according to the predetermined protocol, in which the probe messages include a test indicator and a destination indicator, such that the probe messages 152 elicit the command response 154, from each of the path verification messages 152, allowing the path verification processor 154 on PE1 to apply diagnostic logic according to the predetermined protocol, as depicted at step 311. The test indicator and destination indicator in the path verification message 152 include information about other remote nodes 142 and reachability thereof. The receiving node 142 performs the requested check of the node in the destination indicator, and writes the test result in the test indicator. For example, node 142-1 receives a message inquiring about reachability of provider edge PE node 132 (FIG. 1). Additionally, PE node 130 receives a similar message. If PE node 130 can see PE node 132, however node 142-1 cannot see node 132, there appears to be a problem at node 142-1. Presumably, PE node 130 accesses PE node 132 via node 142-2, a subsequent path verification message to node 142-2 may confirm. In both cases, the path verification processor 124 on PE1 is requesting and obtaining information about access by a distinct, remote node to another distinct, remote node, as carried in the test indicator field, rather than merely identifying nodes which the path verification processor 124 itself may reach. Typical conventional ping and related operations identify success only with respect to the sending (pinging) node, not on behalf of other nodes.

Further to the above example, the path verification processor 124 receives command responses 154 corresponding to the transmitted path verification messages 152, in which the command responses 154 include a test result concerning the node in the destination indicator, according to the diagnostic protocol, as depicted at step 312. The path verification processor 124 aggregates the command responses 154 to track the command responses received from each of the plurality of path verification messages 152 transmitted along a particular suspect path from a source to a destination, as shown at step 313. A check is performed, at step 314, to determine if the tracked command responses indicate problems. If not, then the path verification processor 124 continues repeating the transmission of path verification messages to successive nodes along the path to the node indicating the problem, as depicted at step 315 therefore traversing each of the prefixes along a suspect path to identify the cause.

If a particular command response 154 indicates a problem, at step 314, then the path verification processor 124 on PE1 attempts to detect a core network problem in the core network segment 164. Often, a network provides multiple physical paths between routers, and the routers adaptively change routes to avoid problem areas. This practice is known as convergence, and may occur shortly after a path verification message indicates a failure via a command response 154.

Figure 6:
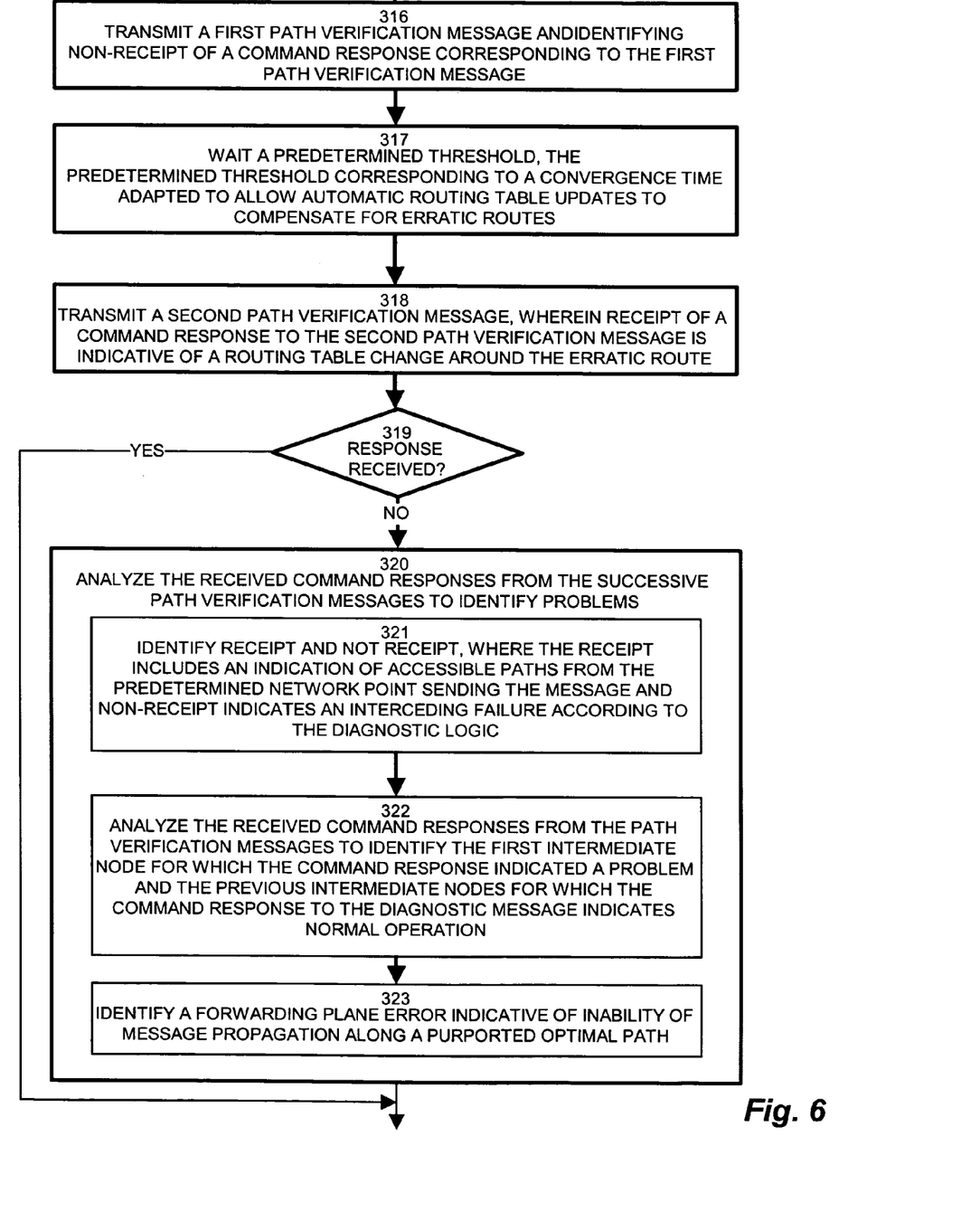

Accordingly, the path verification processor identifies non-receipt or a negative command response corresponding to the first path verification message 152, as shown at step 316. The path verification processor 124 then waits for a predetermined threshold, in which the predetermined threshold corresponding to a convergence time adapted to allow automatic routing table updates to compensate for erratic routes, as depicted at step 317. Following the convergence threshold time, the path verification processor transmits a second path verification message, in which receipt of a command response 154 to the second path verification message 152 is indicative of a routing table change or other convergence correction around the erratic route, as shown at step 318.

If the path verification processor receives a positive response from the second path verification message, as depicted at step 319, then the path verification processor concludes a convergence issue within the core network segment 164, reports this back to CE1, and control reverts to step 300 until the next diagnostic interval. If the convergence threshold check does not resolve the failure, then the path verification processor analyzes the received command responses from the successive path verification messages to identify the problem or failure, as shown at step 320, and reports this to CE1. The path verification processor aggregates and analyzes the responses 154 received with respect to the path to the prefix where the failure was indicated. Analyzing the response messages 154 further includes identifying receipt and not receipt, in which the receipt includes an indication of accessible paths from the predetermined network point sending the message and non-receipt indicates an interceding failure according to the diagnostic logic, as shown at step 321. In a particular path from a source to a destination, such analysis may include analyzing the received command responses from the path verification messages to identify the first intermediate node for which the command response indicated a problem and the previous intermediate nodes for which the command response to the diagnostic message indicates normal operation, as disclosed at step 322. In other words, analysis strives to identify the first network hop at which the failure is identifiable. The immediately preceding hop, or last successful prefix along the path which is reachable (i.e. responses 154 indicate no problems) and the first unsuccessful hop tend to identify the range in which the failure occurs. Such analysis is operable to identify a forwarding plane error indicative of inability of message propagation along a purported optimal path, as depicted at step 323. As indicated above, a forwarding plane error, such as a failure concerning a forwarding engine, port, or switching fabric, may not be immediately apparent at the control plane (i.e. the routing logic) making the routing decisions. By interrogating successive hops along the path known to be problematic, the first offending hop is identifiable.

The convergence scenario, in particular configurations, is scrutinized based on the overall traffic volume. In a congested network, it may be beneficial to risk dropping some packets and wait the lag time for the convergence threshold to elapse rather then reroute packets over a known congested route.

Figure 7:
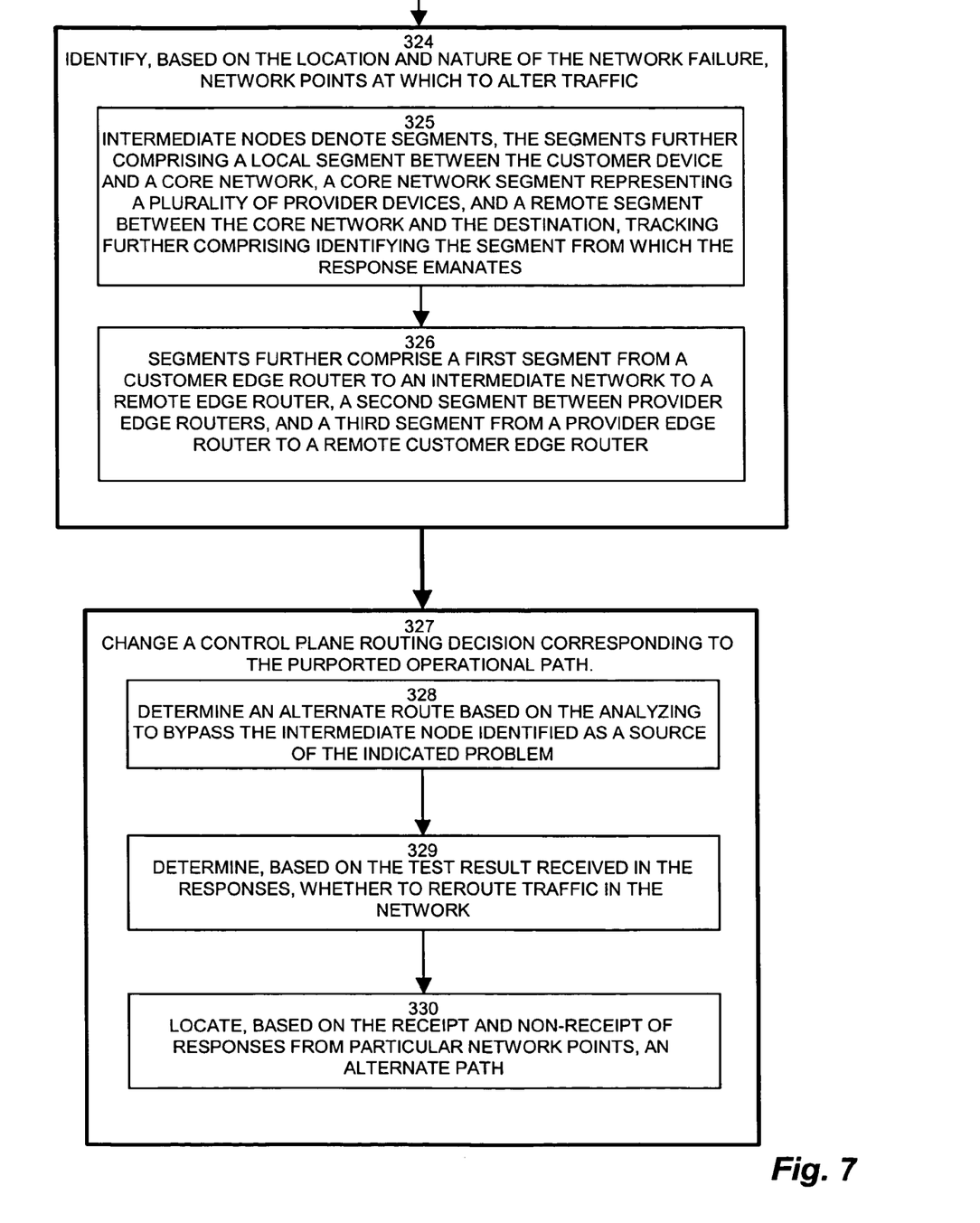

Once the analyzing indicates the offending location, hop, or node, the path verification processor 124 identifies, based on the location and nature of the network failure, network points at which to alter traffic, as shown at step 324. For example, given the path from the local VPN LAN 110 to the remote VPN LAN 112 (FIG. 3), if a problem is found in either the router PE1 (130-11) or in the hop to node 142-11, an alternate path is to reroute traffic from CE1 to enter the core network 140 at PE2 (130-12) rather than PE1, to avoid the failure and still maintain a path to PE3 at the remote side of the core network 140. Further, the intermediate nodes denote segments 160, in which the segments further include a local segment 162 between the customer device and a core network, a core network segment 164 representing a plurality of provider devices, and a remote segment 166 between the core network and the destination, such that tracking further comprising identifying the segment from which the response emanates, as depicted at step 325. In particular configurations, the segments are identifiable by a distance from the path verification processor or local CE router 120, in which the segments further include a first segment 162 from a customer edge router to an intermediate network to a remote edge router, a second segment 164 between provider edge routers, and a third segment 166 from a provider edge router to a remote customer edge router, as shown at step 326.

As indicated above, the determination of an alternate route may involve changing a control plane routing decision corresponding to the purported operational path, as depicted at step 327. The path verification processor 124 determines an alternate route based on the analyzing of step 320 to bypass the intermediate node identified as a source of the indicated problem from step 324, as disclosed at step 328. The conclusion of the routing decision based on the receipt of the response messages includes determining, based on the test result received in the responses, whether to reroute traffic in the network, as disclosed at step 329, and if so, locating, based on the receipt and non-receipt of responses from particular network points, an alternate path operable to transport the traffic to the same destination or VPN subnetwork.

Referring to FIG. 3, a control plane routing decision may proceed as follows. An optimal (shortest) path from the local VPN LAN 110 includes PE1 to PE3 via nodes 142-11, 142-12 and 142-13. Referring to the above example, the path verification processor 124 on PE1 identifies a failure as a forwarding engine in node 142-11, included in the optimal (shortest) path to the remote VPN LAN 112. Conventional methods would cause the control plane to continue routing down the optimal path, causing black holing and/or queuing at node 142-11. Note further that, in some circumstances, the core network may be a public access and/or external provider network, and therefore not directly responsive to the path verification processor (i.e. not under direct user control as the VPN). The path verification processor 124 on CE1, nonetheless, observes the alternate path via PE2, through nodes 142-14 and 142-15, merging with the optimal (shortest) path at 142-13. The path verification processor 124 on CE1 overrides the routing logic 122, which favors PE1 as the preferred entry into the core 140, and employs PE2 as the alternate path. Accordingly, the path verification processor addresses a problem in the core network (142-11) by observing and determining a new PE device, which the routing logic 122 has control over, and avoids the data plane condition which would have continued to direct traffic to failed node 142-11. Similarly, if a problem is diagnosed as affecting CE2, an alternate route into the remote VPN LAN 112 from PE3 includes CE3.

In further detail, an exemplary PVP scenario in the system of FIG. 3 is as follows. Continuing to refer to FIG. 3, if multiple requests are received for the same remote destination from different locally attached clients of the same VPN, the PE-router should aggregate the path verification check. PEs perform a next-hop-self when originating certain routes. Accordingly, the PE that receives a PVP message from a CE asking to verify the path to 116-1 and 116-2, will be able to see that both prefixes have the same BGP next-hop (i.e. the remote PE3). With such information the PVP procedure may be aggregated for the core portion 164 of the path as follows: Note that, for the following example, as illustrated in FIG. 3, CE1 is connected to PE1 and PE2. Further note that CE2 is attached to PE3, and CE3 is also attached to PE3. Concerning the subnet prefixes 116-1, 116-2 and 116-3, prefix PE1 is connected to CE1, prefix 116-1, 116-2 and 116-3 are connected to CE2 and CE3, as described in the following sequence:

CE1 wishes to verify the path to prefixes 116-1, 116-2 and 116-3. This assumes that a previous ping to these devices has failed CE1 reads the community/tag of the prefixes and finds who are the next-hops of the prefixes as follows:
  116-1→PE1
  116-2→PE1
  116-3→PE1

CE1 prepares 3 PVP messages. These may be basic or advanced as detailed below:
  PVP for 116-1 destined to PE1
  PVP for 116-2 destined to PE1
  PVP for 116-3 destined to PE1
  CE1 sends the PVP messages to PE1
  PE1 inspect the destination of these PVP messages and finds that prefixes 116 are in fact connected to the same PE (PE3).

If the request is a basic check then PE1 will send a ping to each of the prefixes 116. If this is successful it will respond with a positive response to CE1. If a ping fails it will respond with a negative response to CE1.

If the request is an advanced check, PE1 prepares one PVP message:
  PVP for PE3 (including PVP for 116-1, 116-2 and 116-3)
  PE1 sends this PVP message to PE3
  When PE3 receives the PVP message, it will:
    Check who is the next-hop to 116-1, 116-2 and 116-3 and find that the same next-hop is used
    Initiate PVP messages to the appropriate CE.

Assuming a request for BPV (Basic Path Verification), the client (i.e. the local VPN LAN 110, or CE1 120-11, in this example) will either receive a positive or negative response from the PE 130-11. If a positive response is received then it will assume the problem lies within the switching path of the ingress PE 130-11 (PE1) as this PE is able to reach the remote destination but packets from the CE1 are not, indicating a local switching failure on PE1 and will therefore instigate local reroute (the details of which are implementation specific depending on the network management protocol/mechanism employed). If the response is negative then the client should either assume a convergence event is in process and take no further action, or, based on configuration, and criteria such as path cost increase along the alternate path, decide to trigger a local reroute.

Assuming an request for APV (Advanced Path Verification), the PE-router 130 will identify whether the problem lies (1) within the core network 146, (2) a remote PE-router 132, or (3) outside of the core network.

If the problem is within the core network 164 then the PE 130 will respond to the client 120-11 indicating a core 146 issue. Techniques relying on timer-based approach can be used to that end whereby the PE 130 may start a timer whose value will reflect the worst IGP convergence time. The client should take this information to mean that a convergence event is happening and therefore take no action.

If the problem is a remote PE-router 132, then the PE will respond to the client indicating this. The failure of the remote PE-router 132 may be a real failure (e.g. route processor, power supply, line cards, etc.), in which case a convergence event is in process, or it may be a switching failure in which case a convergence event is not in process. In either case, the client CE1 will initiate a local reroute if another path is available via another PE, regardless of whether the cost of this path is greater than the current best path (i.e. should trigger inter-layer failure notification mechanism). This would increase to reach the destination either via another PE or via a different operational interface of the same PE.

if the problem is outside of the core network 164 then the client CE1 should take no action.

In any of the failure cases the client should log the verification response received from the PE-router.

Once a local reroute has been initiated, the client starts a configurable timer Y upon expiration of a new verification is triggered. This is to ensure a more optimal path is re-established once the cause of the original failure has been rectified and provided the routing protocol still selects the original (i.e. pre-failure) path as the best path.

Those skilled in the art should readily appreciate that the programs and methods for identifying network failure as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for identifying network failure has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of identifying network failure comprising:
  periodically transmitting diagnostic messages to a plurality of predetermined routing points along a path to a destination;
  transmitting, if the diagnostic messages indicate a problem with intermediate nodes along the path, a series of path verification messages, each of the path verification messages including a command operable to direct an intermediate node to transmit a further message to a successive intermediate node in the path, receive the result from the further message, and report the result as a command response, the result indicative of reachability of the successive intermediate node;
  repeating the transmission of path verification messages to successive nodes along the path to the node indicating the problem;
  analyzing the received command responses from the successive path verification messages to identify problems; and
  determining an alternate route based on the analyzing to bypass the intermediate node identified as a source of the indicated problem.

2. The method of claim 1 wherein analyzing further comprises analyzing the received command responses from the path verification messages to identify the first intermediate node for which the command response indicated a problem and the previous intermediate nodes for which the command response to the diagnostic message indicates normal operation.

3. The method of claim 2 wherein the intermediate nodes denote segments, the segments further comprising a local segment between the customer device and a core network, a core network segment representing a plurality of provider devices, and a remote segment between the core network and the destination, tracking further comprising identifying the segment from which the response emanates.

4. The method of claim 3 wherein the segments further comprise a first segment from a customer edge router to an intermediate network to a remote edge router, a second segment between provider edge routers, and a third segment from a provider edge router to a remote customer edge router.

5. A method of identifying network failure comprising:
periodically transmitting diagnostic messages to a plurality of predetermined routing points along a path to a destination;
transmitting, if the diagnostic messages indicate a problem with intermediate nodes along the path, a series of path verification messages, each of the path verification messages including a command operable to direct an intermediate node to transmit a further message to a successive intermediate node in the path, receive the result from the further message, and report the result as a command response, the result indicative of reachability of the successive intermediate node;
repeating the transmission of path verification messages to successive nodes along the path to the node indicating the problem;
analyzing the received command responses from the successive path verification messages to identify problems;
determining an alternate route based on the analyzing to bypass the intermediate node identified as a source of the indicated problem;
wherein transmitting further comprises:
transmitting a plurality of path verification messages to a plurality of predetermined network points according to a diagnostic protocol;
receiving command responses corresponding to the transmitted path verification messages, the command responses including a test result according to the diagnostic protocol; and
tracking the command responses received from each of the plurality of path verification messages transmitted along a path from a source to a destination.

6. The method of claim 5 wherein analyzing further comprises identifying receipt and non-receipt, where the receipt includes an indication of accessible paths from the predetermined network point sending the message and non-receipt indicates an interceding failure according to the diagnostic logic.

7. The method of claim 6 further comprising identifying, based on the location and nature of the network failure, network points at which to alter traffic.

8. The method of claim 7 further comprising:
identifying important prefixes corresponding to network routing points having substantial logistic routing value; and
transmitting the diagnostic messages to the important prefixes.

9. The method of claim 8 further comprising determining active prefixes, the active prefixes indicative of a substantial volume of routing traffic during a previous threshold timing window.

10. The method of claim 9 wherein the substantial volume of routing traffic load is based on a predetermined minimum quantity of bytes transported and the important paths correspond to the number of alternative routing paths available.

11. The method of claim 10 wherein the path verification messages are probe messages according to the predetermined protocol, the probe messages include a test indicator and a destination indicator and concluding further comprises applying diagnostic logic according to the predetermined protocol.

12. The method of claim 11 further comprising staggering the diagnostic messages based upon a jitterable configurable timer driving an end to end path check.

13. The method of claim 12 wherein identifying the intermediate nodes further corresponds to identifying a network prefix corresponding to a network hop between a test initiator and a destination.

14. A method of identifying network failure comprising:
periodically transmitting diagnostic messages to a plurality of predetermined routing points along a path to a destination;
transmitting, if the diagnostic messages indicate a problem with intermediate nodes along the path, a series of path verification messages, each of the path verification messages including a command operable to direct an intermediate node to transmit a further message to a successive intermediate node in the path, receive the result from the further message, and report the result as a command response, the result indicative of reachability of the successive intermediate node;
repeating the transmission of path verification messages to successive nodes along the path to the node indicating the problem;
analyzing the received command responses from the successive path verification messages to identify problems, wherein analyzing further comprises identifying a forwarding plane error indicative of inability of message propagation along a purported optimal path, and determining an alternate route based on the analyzing to bypass the intermediate node identified as a source of the indicated problem, wherein determining comprises changing a control plane routing decision corresponding to the purported operational path.

15. The method of claim 14 wherein transmitting the path verification messages further comprises:
transmitting a first path verification message;
identifying non-receipt of a command response corresponding to the first path verification message;
waiting a predetermined threshold, the predetermined threshold corresponding to a convergence time adapted to allow automatic routing table updates to compensate for erratic routes; and
transmitting a second path verification message, wherein receipt of a command response to the second path verification message is indicative of a routing table change around the erratic route.

16. A method for locating network failures comprising:
transmitting a plurality of path verification messages to a plurality of predetermined network points according to a diagnostic protocol;
receiving command responses corresponding to the transmitted path verification messages, the responses including a test result according to the diagnostic protocol;

tracking the command responses received from each of the plurality of path verification messages transmitted along a path from a source to a destination; and concluding, based on the receipt of responses from the predetermined network points, alternate routing paths for message traffic in the network.

17. The method of claim 16 wherein concluding based on the receipt of messages further comprises:

determining, based on the test result received in the responses, whether to reroute traffic in the network; and locating, based on the receipt and non-receipt of responses from particular network points, an alternate path.

18. A method for locating a deficient network interconnection comprising:

identifying a path from a data communication device to a remote network destination, the path further including a plurality of segments, each segment delimited by a hop;

identifying the failure point comprising identifying a segment order defined by a path to the destination;

iteratively transmitting a probe to each successive hop along the ordered path;

concluding, if a probe response returns with respect to a particular hop, that the path is unobstructed up to the hop corresponding to the returned probe;

concluding, if the probe response is not received for a particular probe, that an obstruction exists between the hop corresponding to the particular probe and previous hop;

identifying, based on the hop corresponding to the concluded obstruction, an alternate path; and determining, based on the identified alternate path, whether to direct message traffic to the identified alternate path.

19. A method for network failure location identification comprising:

enumerating a set of significant routes, the significant routes carrying a substantial traffic load over a critical path;

identifying active routes from the significant routes based on recently carried traffic;

determining, for each of the identified active routes, whether an unobstructed network path exists;

applying, for each active route determined to have an obstruction, a path verification to identify a path segment corresponding to a point of obstruction, the path verification process further comprising:

pinging each of a plurality of intermediate hops;

identifying hops for which the ping response is deficient;

repinging, if the ping response was deficient, the hop after waiting for a convergence threshold delay;

concluding, if the response to the repining is received, a core network failure which has been rerouted around; and determining if the repinging response is not received, a failure at a point between the repinged hop and the previous hop.

20. A data communications device for identifying network failure comprising:

a memory operable to store instructions and data;

an execution unit coupled to the memory, the execution unit in communication with the data and responsive to the instructions;

a network interface coupled to other data communications devices;

a path verification processor in the execution unit operable to periodically transmit diagnostic messages, via the network interface, to a plurality of predetermined routing points along a path to a destination, and further operable to transmit, if the diagnostic message indicate a problem with intermediate nodes along the path, a series of path verification messages, each of the path verification messages including a command operable to:

direct an intermediate node to transmit a further message to a successive intermediate node in the path;

receive the result from the further message; and report the result as a command response, the result indicative of reachability of the successive intermediate node, the path verification processor further operable to:

repeat the transmission of path verification messages to successive nodes along the path to the node indicating the problem; and analyze the received command responses from the successive path verification messages to identify problems; and routing logic in the memory and responsive to the path verification processor and operable determining an alternate route based on the analyzing to bypass the intermediate node identified as a source of the indicated problem.

21. The data communications device of claim 20 wherein the path verification processor is further operable to analyze the received command responses from the path verification messages to identify the first intermediate node for which the command response indicated a problem, and the previous intermediate nodes for which the command response to the diagnostic message indicates normal operation.

22. The data communications device of claim 21 wherein the intermediate nodes denote segments, the segments further comprising a local segment between the customer device and a core network, a core network segment representing a plurality of provider devices, and a remote segment between the core network and the destination, tracking further comprising identifying the segment from which the response emanates.

23. The method of claim 20 further comprising a network interface coupled to the path verification processor, the network interface operable to:

transmitting a plurality of path verification messages to a plurality of predetermined network points according to a diagnostic protocol;

receiving command responses corresponding to the transmitted path verification messages, the command responses including a test result according to the diagnostic protocol; and forward the command responses to the path verification processor for tracking the command responses received from each of the plurality of path verification messages transmitted along a path from a source to a destination.

24. The data communications device of claim 23 wherein the path verification processor is further operable to:

identify important prefixes corresponding to network routing points having substantial logistic routing value; and transmit the diagnostic messages to the important prefixes.

25. The data communications device of claim 24 wherein the path verification processor is further operable to determine active prefixes, the active prefixes indicative of a substantial volume of routing traffic during a previous threshold timing window.

26. The data communications device of claim 25 wherein the path verification messages are probe messages according to the predetermined protocol, the probe messages include a test indicator and a destination indicator and concluding further comprises applying diagnostic logic according to the predetermined protocol.

27. The data communications device of claim 20 wherein the path verification processor is further operable to:

identify a forwarding plane error indicative of inability of message propagation along a purported optimal path, and determine comprises changing a control plane routing decision corresponding to the purported operational path.

28. The data communications device of claim 27 wherein the path verification processor is further operable to:

transmit a first path verification message;

identify non-receipt of a command response corresponding to the first path verification message;

wait a predetermined threshold, the predetermined threshold corresponding to a convergence time adapted to allow automatic routing table updates to compensate for erratic routes; and transmit a second path verification message, wherein receipt of a command response to the second path verification message is indicative of a routing table change around the erratic route.

29. A computer program product having a computer readable storage medium operable to store computer program logic embodied in computer program code, the computer program code executable with a processor to identify network failure, the computer readable storage medium comprising:

computer program code executable to periodically transmit diagnostic messages to a plurality of predetermined routing points along a path to a destination;

computer program code executable to transmit, if the diagnostic message indicate a problem with intermediate nodes along the path, a series of path verification messages, each of the path verification messages including a command operable to direct an intermediate node to transmit a further message to a successive intermediate node in the path, receive the result from the further message, and report the result as a command response, the result indicative of reachability of the successive intermediate node;

computer program code executable to repeat the transmission of path verification messages to successive nodes along the path to the node indicating the problem;

computer program code executable to analyze the received command responses from the successive path verification messages to identify problems; and computer program code executable to determine an alternate route based on the analyzing to bypass the intermediate node identified as a source of the indicated problem.

* * * * *